United States Patent
Slutter et al.

(10) Patent No.: US 7,493,099 B2
(45) Date of Patent: Feb. 17, 2009

(54) ONBOARD ELECTRONIC SYSTEM WITH USER CONTROLLED TEMPORAL CHARACTERISTICS

(75) Inventors: Warren Stephen Slutter, Lebanon, NJ (US); Neil Stein, 10 Claremont Dr., Maplewood, NJ (US) 07040

(73) Assignees: Warren S. Slutter, Lebanon, NJ (US); Neil Stein, Maplewood, NJ (US)

( * ) Notice: Subject to any disclaimer, the term of this patent is extended or adjusted under 35 U.S.C. 154(b) by 752 days.

(21) Appl. No.: 10/199,767

(22) Filed: Jul. 19, 2002

(65) Prior Publication Data
US 2004/0198305 A1    Oct. 7, 2004

(51) Int. Cl.
*H04B 1/06* (2006.01)
(52) U.S. Cl. ............... 455/345; 455/403; 455/414.1
(58) Field of Classification Search ............ 455/345, 455/344, 349, 351, 354, 355, 403, 3.06, 414.1, 455/73, 77, 78, 82, 550.1, 553.1, 556.1, 575.9, 455/90.2, 95, 168.1, 179.1
See application file for complete search history.

(56) References Cited
U.S. PATENT DOCUMENTS

| | | | | |
|---|---|---|---|---|
| 4,290,127 A | * | 9/1981 | Pridham et al. ............. 367/123 |
| 5,408,698 A | * | 4/1995 | Serizawa et al. .......... 455/245.1 |
| 5,617,480 A | * | 4/1997 | Ballard et al. ................. 381/98 |
| 5,805,619 A | * | 9/1998 | Gardner et al. .............. 714/814 |
| 6,088,351 A | * | 7/2000 | Jenkin et al. ................ 370/347 |
| 6,678,215 B1 | * | 1/2004 | Treyz et al. .................. 368/10 |
| 6,711,546 B1 | * | 3/2004 | Thomas ..................... 704/500 |
| 6,795,931 B1 | * | 9/2004 | LaBerge ..................... 713/401 |

* cited by examiner

*Primary Examiner*—Tony T. Nguyen
(74) *Attorney, Agent, or Firm*—Anthony H. Handal; Thompson Hine LLP

(57) ABSTRACT

A mobile radio receiver system for a vehicle providing recent segment replay function is disclosed. The wireless receiver is adapted to be contained within the vehicle. A digital delay line is coupled to receive the output of the wireless receiver. A delay selection switch is coupled to the digital delay line to route the output of the wireless receiver with a selected temporal delay in response to actuation by a person riding in the vehicle. In accordance with the preferred embodiment, the recent transmitted segment ends at the time that the delay selection switch is actuated. A control device is associated with the wireless receiver for receiving control selections from the person riding in the vehicle. An amplifier is coupled to receive the routed output of the wireless receiver. An audio transducer this adapted to receive the output of the amplifier and provide an audible signal to the person riding in the vehicle.

19 Claims, 6 Drawing Sheets

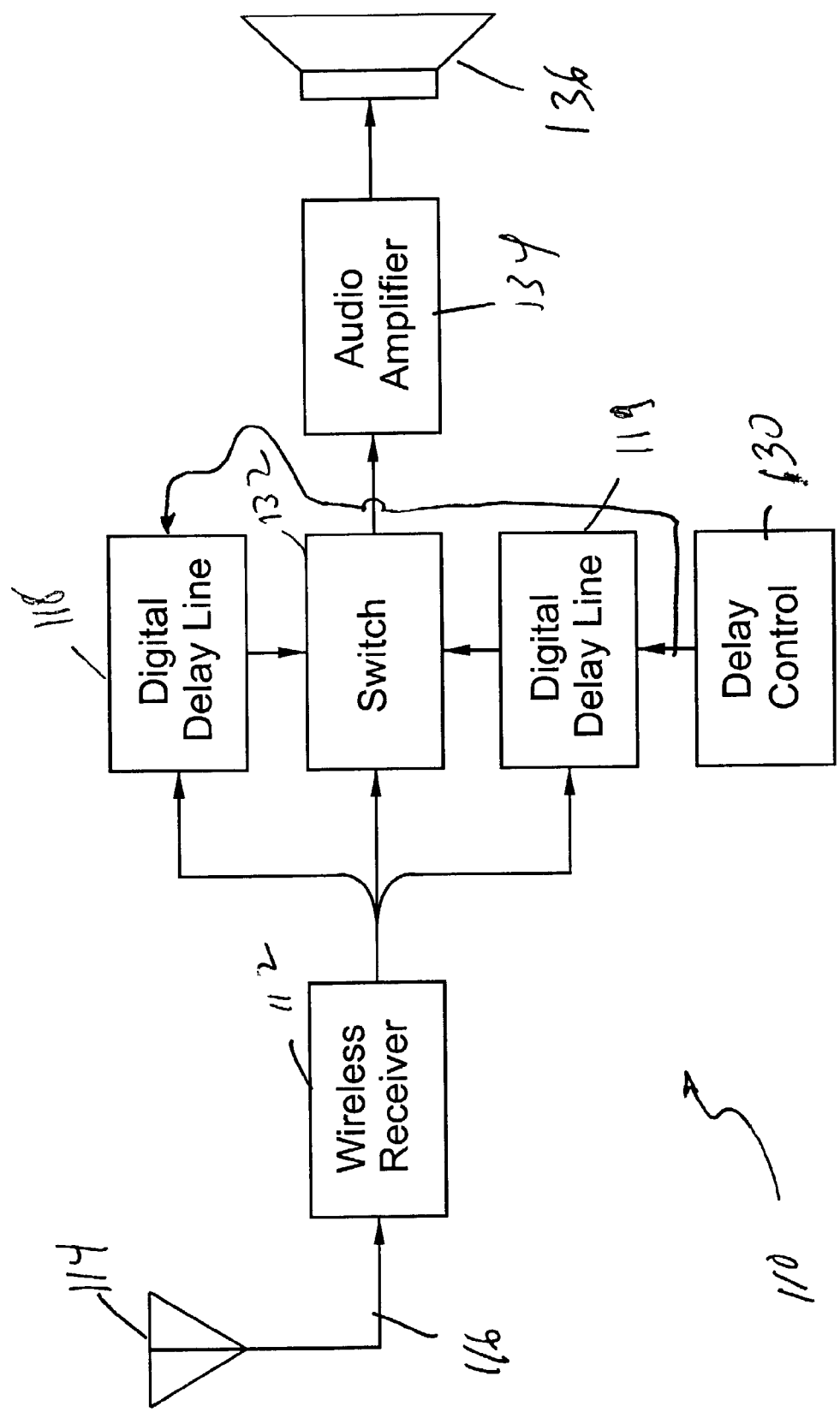

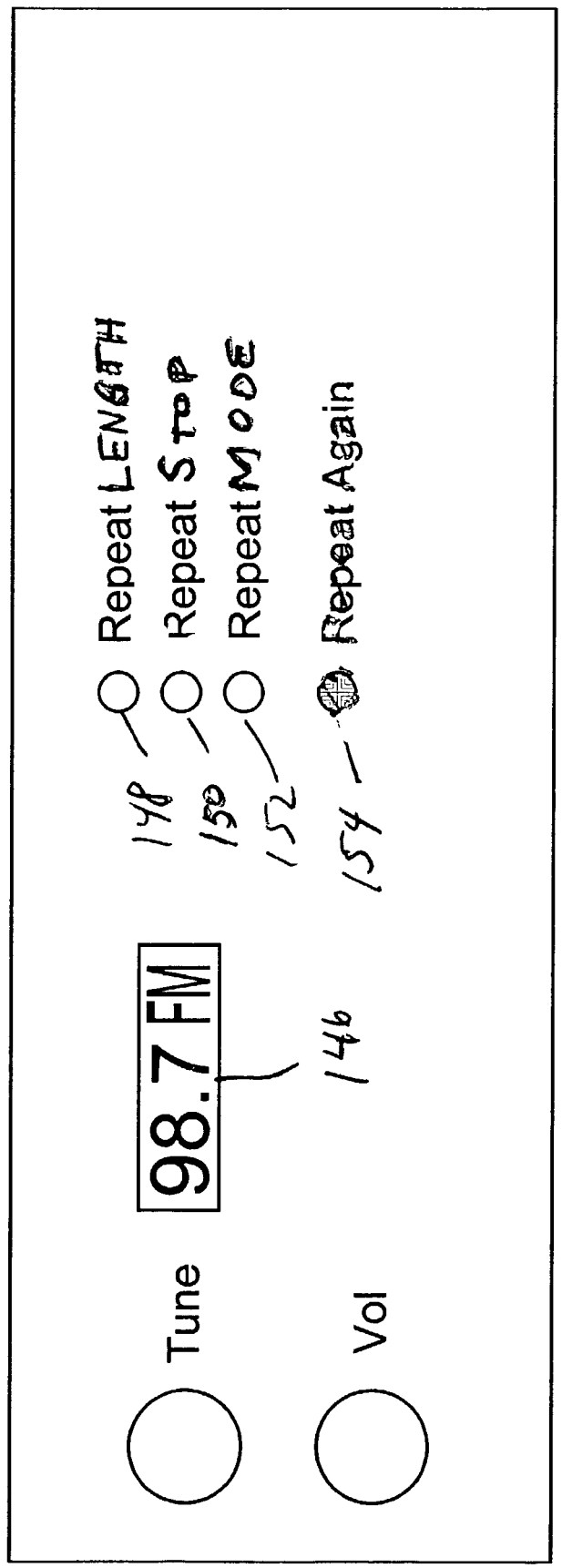

ONBOARD ELECTRONIC SYSTEM WITH USER CONTROLLED TEMPORAL CHARACTERISTICS

TECHNICAL FIELD

The present invention relates to improvements in mobile radios and other electronic systems, such as those used in vehicles to provide entertainment, news and other information.

BACKGROUND

In recent years, the increasing pervasiveness of technology has not left the mobile sector unchanged. To the contrary, automobiles, trucks and other vehicles are experiencing an increasing deployment of technology. While such technology has the advantage of improving the driving experience, much of this technology, particularly electronic technology, also increases the mental overhead necessary to operate the vehicle. Thus, the driver must not only control the vehicle and monitor the traffic which surrounds the vehicle being operated, but attention must also be given to GPS navigation equipment, pagers, engine efficiency gauges, and so forth. Most seriously, in recent years, cellular telephones have added yet one more distraction for the motorist operating a vehicle.

Over the years, many innovations have been introduced in an attempt to minimize driver distractions during operation of a motor vehicle. For example, early on, preset channel buttons were introduced, thus reducing the level of distraction introduced by -tuning of a radio. More recently, multiple functions have been combined, and single buttons, which when repeatedly pressed, put the equipment in different functional configurations. The particular functional configuration associated with the point in the sequence of multiple pressings is given to the operator on the display of the radio. When the multiple functions button is not clicked again after making a certain display, the radio changes, after a preset period of time on the order of one or two seconds, to the particular functional configuration last displayed.

SUMMARY OF THE INVENTION

Indeed, the situation created by cellular phones, in particular, is recognized as being highly dangerous. Accordingly, numerous jurisdictions are considering adopting legislation preventing or limiting the use of cellular telephones while driving. However, in accordance with a present invention, it has been recognized by the applicant that cellular telephones are only part of the problem. Also in accordance with the present invention, it has been recognized that distractions created by one mobile system will impair operation of other systems on board the vehicle. More particularly, the present invention recognizes that the heart of many of the above discussed problems is the inability of the motorist to control timing of electronic inputs in a manner which promotes safety by allowing a driver to set priorities and attend to multiple functions to achieve the overall objectives of the motorist.

More particularly, general broadcast radio, whether it be in the standard AM broadcast band, the FM band, satellite based or the like, remains one of the most important tools for an individual operating a vehicle. Such broadcast services provide much information important to the operation of the vehicle, such as information on road conditions, weather or the like. In addition, the radio provides entertainment which results in less fatigue. Finally, a radio in a vehicle also promotes mental involvement, activity and, accordingly, reduces the likelihood that a motorist will fall asleep at the wheel.

However, such important information, as the weather or traffic conditions, often comes at a time when the motorist must pay attention to something else, such as outside traffic, a pedestrian, an unusual turn in the road, or even dangerous conditions such as sand or ice. Accordingly, the motorist is faced with either attending to the problem on the road in a distracted fashion, or losing the information. Most often, such information is lost due to the fact that the motorist was concentrating on one task while the information which he needs is being given over the radio. Often, the motorist will absorb bits of the needed information or at least indications that the needed information has been given. However, this information is useless.

The result is that the motorist begins to pay attention to the radio, instead of driving the car in an undistracted fashion, in an attempt not to miss the information, if it is given again.

In other situations, the motorist becomes aware that the information is being given and neglects the driving task at hand in an attempt not to miss the information when it is given.

Likewise, if a cellular telephone rings, the motorist often feels compelled to answer it immediately. Reasons for this include fear of losing a call, curiosity, and simple habitual reaction. The inventive system provides an effective means of addressing these issues.

The inventive mobile radio receiver system for a vehicle comprises a wireless receiver adapted to be contained within the vehicle. A digital delay line is coupled to receive the output of the wireless receiver. A delay selection switch is coupled to the digital delay line to route the output of the wireless receiver with a selected temporal delay in response to actuation by a person riding in the vehicle. In accordance with the preferred embodiment, the recent transmitted segment ends at the time that the delay selection switch is actuated. A control device is associated with the wireless receiver for receiving control selections from the person riding in the vehicle. An amplifier is coupled to receive the routed output of the wireless receiver. An audio transducer this adapted to receive the output of the amplifier and provide an audible signal to the person riding in the vehicle.

In accordance with the preferred embodiment, the delay selection switch allows the person riding in the vehicle to play back a recent transmitted segment. In addition, a delay selection switch allows the person riding in the vehicle to select play back of a recent transmitted segment having a first duration, a recent transmitted segment having a second duration, or a recent transmitted segment having a third duration.

In one embodiment, the delay selection switch comprises a single button which selects between different modes upon being depressed repeatedly.

In another embodiment, the delay selection switch comprises first, second and third buttons, the buttons being positioned on a control panel associated with the wireless receiver. Actuation of one of the buttons by the person riding in the vehicle results in the replaying of segments of different duration, depression of the first button resulting in playback of a first recent transmitted segment having a first duration, depression of the second button resulting in a second recent transmitted segment having a second duration, and depression of the third button resulting in playback of a recent transmitted segment having a third duration.

It is contemplated that the wireless receiver is a wireless telephone, in which case the system would further comprise a switch for picking up the wireless receiver when it is ringing and a prerecorded signal source for playing a message asking a caller to hold.

In accordance with yet another embodiment of the invention, a mobile radio receiver system of the type described above further comprises a memory device capable of storing a recent transmitted segment until actuated to discard the same.

BRIEF DESCRIPTION OF THE DRAWINGS

These and other objects of the invention will become apparent from the accompanying drawings, in which:

FIG. 5 is a schematic diagram of an alternative embodiment of the present invention; and FIG. 6 illustrates an alternative control panel for a radio constructed in accordance with the invention.

DETAILED DESCRIPTION OF THE BEST MODE OF THE INVENTION

The invention may be understood with reference to FIGS. 1-4. More particularly, in accordance with the invention, a wireless receiver system 10 comprises a wireless receiver 12 which receives input signals from an antenna 14 or other suitable device for gathering radio frequency energy. Antenna 14 is coupled to the input of radio receiver 12 by a coaxial cable 16 or other suitable radio frequency coupling device.

Figure 1:
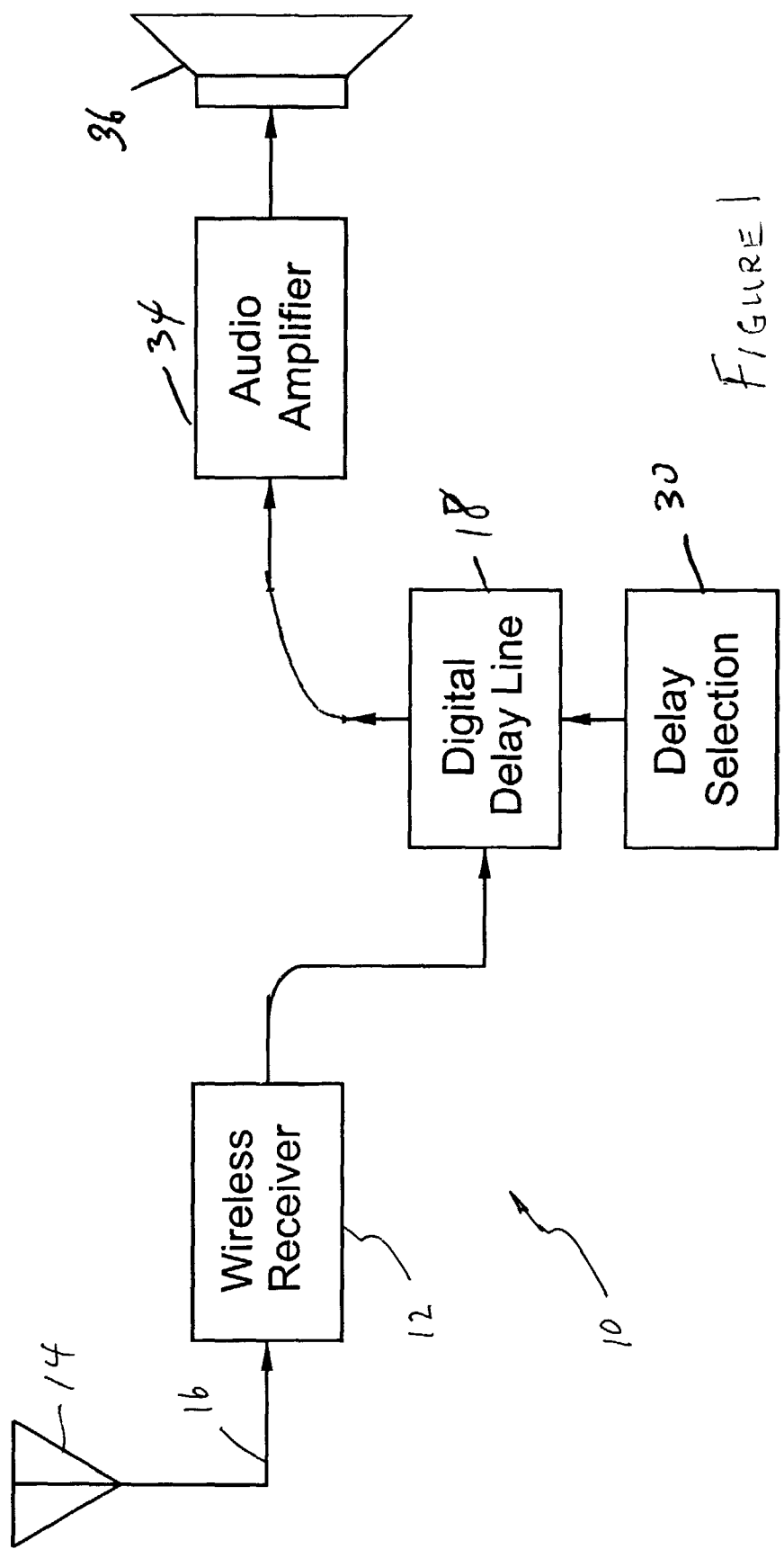
FIG. 1 is a schematic diagram of a radio receiver constructed in accordance with the present invention.
Figure 2:
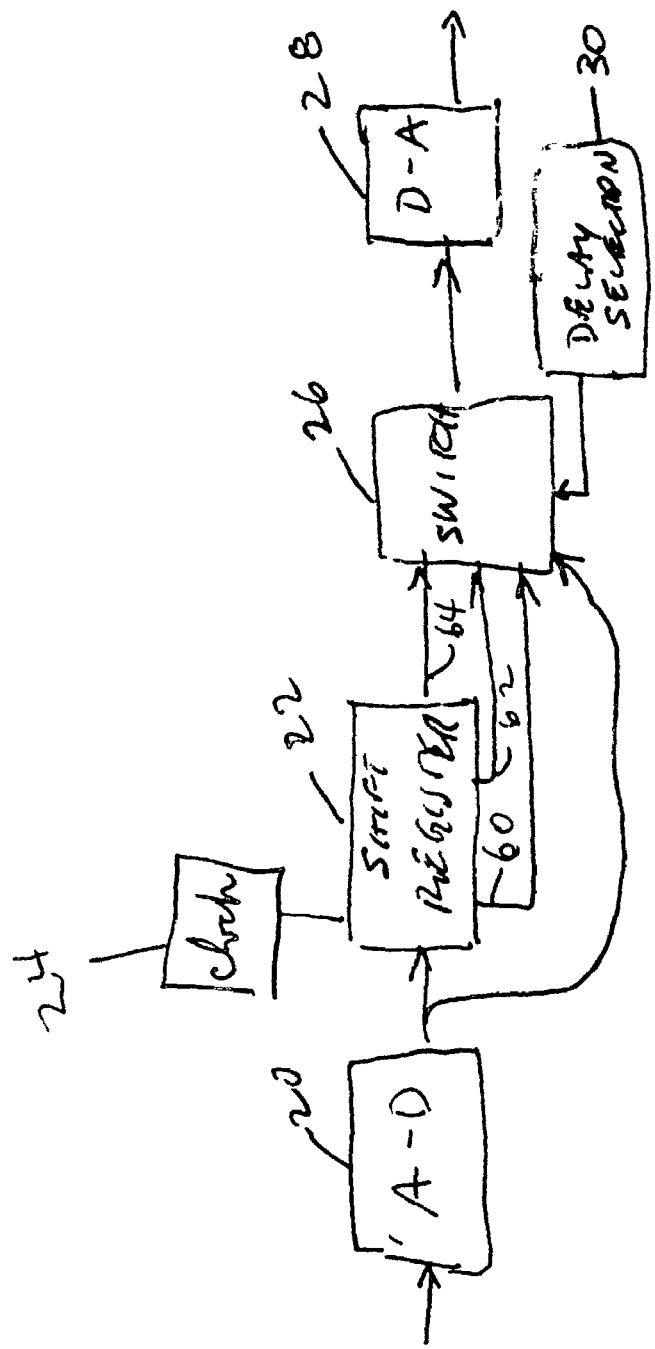
FIG. 2 is a schematic diagram of a digital delay line useful in the present invention.
Figure 3:
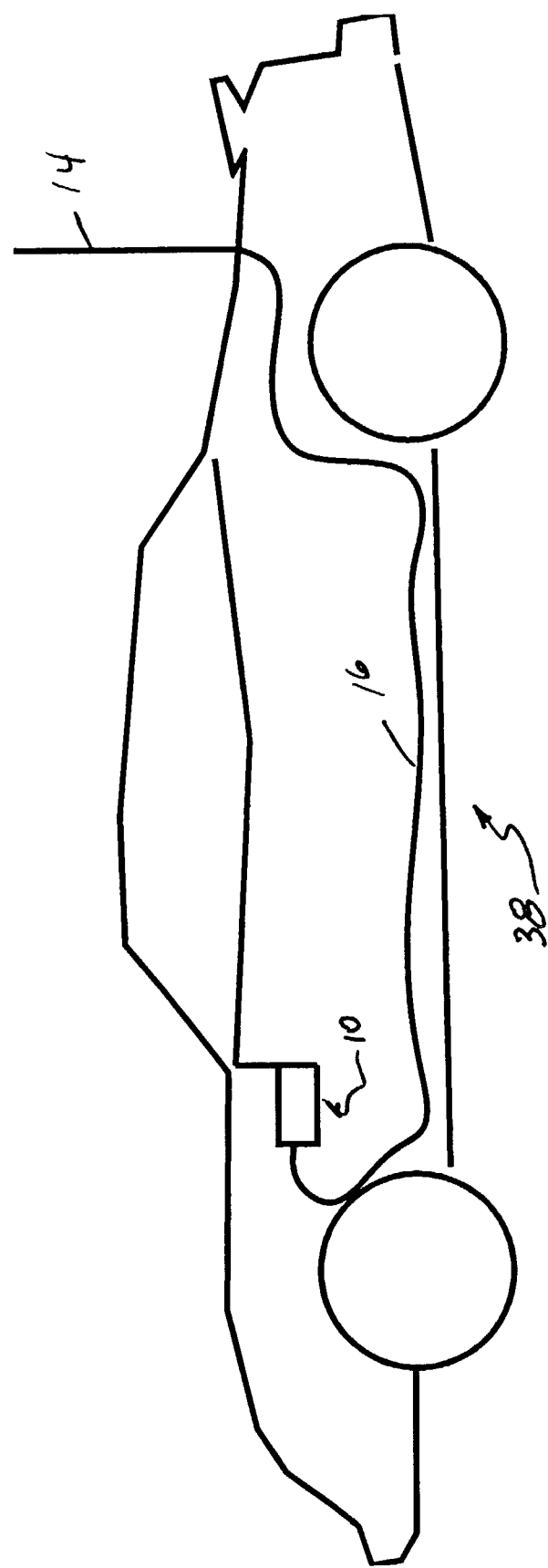
FIG. 3 shows placement of the inventive radio receiver in an automobile.

Wireless receiver 12 has an audio output which is coupled to the input of a digital delay line 18. As illustrated in FIG. 2, digital delay line 18 is of conventional design. Such design may involve the use of an analog to digital converter 20 whose input serves as the input of digital delay line 18. Analog to digital converter 20 is of conventional design and available as an integrated circuit individually or as part of a delay line device. Analog to digital converter 20 receives an input analog signal and produces at its output a delayed signal.

The output of analog to digital converter 20 is coupled to the input of a shift register 22 which, driven by clock 24 causes digital data to pass through a string of bistable multivibrators. The result is that the input analog signal appears in digital form at a plurality of output points in shift register 22 at different times after the signal is input into analog to digital converter 20.

Each of the output points on shift register 22 are coupled to a switch 26. Similarly, the input to shift register 22 is also coupled to switch 26. Switch 26 produces at its output either:
1) the undelayed output of analog to digital converter 20 or
2) one of the variously delayed inputs provided at the output of analog to digital converter 20 and shift register 22, respectively.

The output of switch 26 is, in turn, coupled to the input of digital to analog converter 28. The output of digital to analog converter 28 serves as the output of digital delay line 18.

The selection of which of the inputs of switch 26 is to be output by digital to analog converter 28 is controlled by a delay selection switch 30 coupled to digital delay line 18.

The output of audio amplifier 34 is, in turn, coupled to a loudspeaker system 36 of automobile 38. Audio amplifier 34 is of conventional design receiving low-power signals and producing an output signal matching the impedance and power requirements of loudspeaker system 36.

Figure 4:
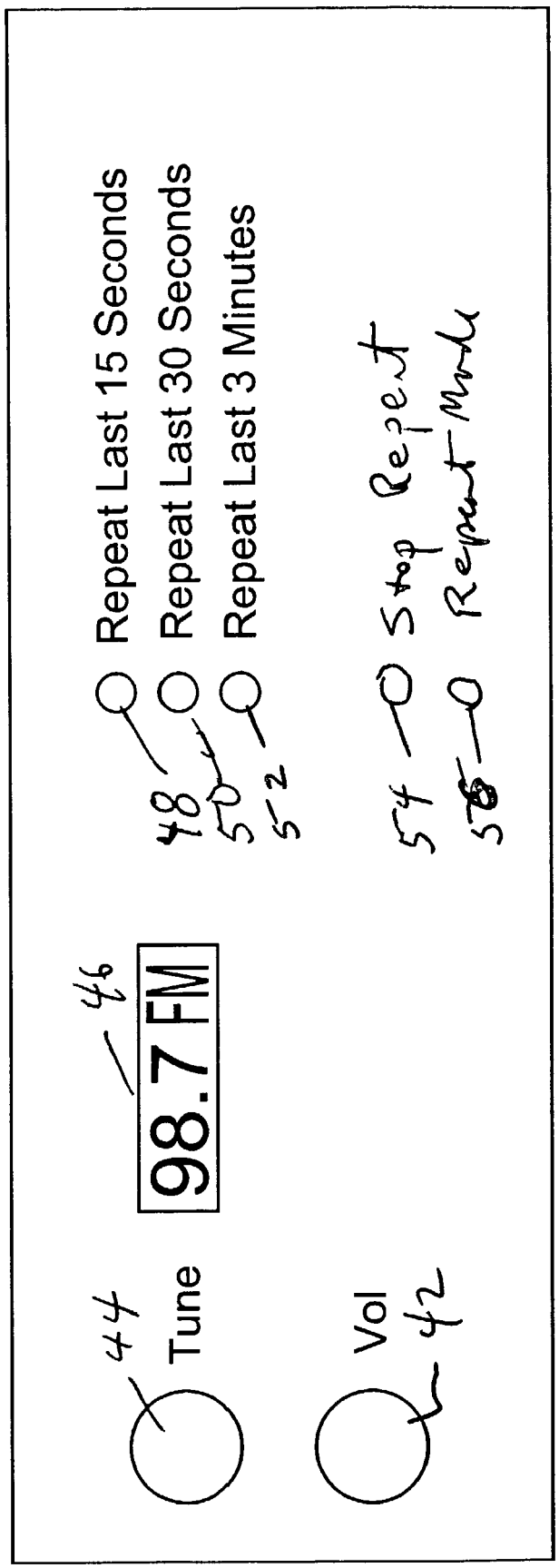
FIG. 4 illustrates the control panel of a radio constructed in accordance with present invention.

Referring to FIG. 4, a suitable control panel 40 for the inventive radio receiver is illustrated. Control panel 40 includes volume control 42, tuning control 44 and a tuning indicator 46. Of course, control panel 40 may also include any of the numerous of the controls customarily found on an automobile radio receiver.

In addition, a pushbutton 48 for instructing the system to repeat the last 15 seconds of a signal output by wireless receiver 22 is provided. A pushbutton 50 for instructing the system to repeat the last 30 seconds of a signal output by wireless receiver 22 is provided. A pushbutton 52 for instructing the system to repeat the last three minutes of a signal output by wireless receiver 22 is provided. Finally, a "Stop Repeat" button 54 for terminating the repeat play feature and coupling the undelayed output of wireless receiver 12 to audio amplifier 34 is provided. A "Repeat Mode" button 56 is provided to give the motorist the opportunity to select whether the delayed signal will continue to be repeated or whether the radio will automatically return to playing an undelayed signal after the selected period of time.

During operation, incoming radio signals are picked up by antenna 14 and carried by cable 16 to wireless receiver 12. Wireless receiver 12 outputs an audio signal which is coupled to analog to digital converter 20. During normal operation, the output of analog to digital converter 20 passes to switch 26 which provides the output of analog to digital converter 20 to a digital to analog converter 28 which, in turn, drives audio amplifier 34. Audio amplifier 34, in turn, drives speaker system 36 to produce and portable audio signal which may be heard by a driver and his passengers.

If the motorist hears something that he wants to be repeated, the motorist may hear the last fifteen seconds, thirty seconds or three minutes by actuation of pushbutton switches 48, 50 or 52, respectively. Upon actuation of switch 48, a fifteen second delayed output 60 of shift register 22 is coupled by switch 26 to digital to analog converter 28. Upon actuation of switch 50, a thirty second delayed output 62 of shift register 22 is coupled by switch 26 to digital to analog converter 28. Upon actuation of switch 52, a three-minute delayed output 64 of shift register 22 is coupled by switch 26 to digital to analog converter 28.

Actuation of switch 64, in turn, will cause the output of analog to digital converter 20, which has no delay, to be passed by switch 26 to digital to analog converter 28.

In accordance with the preferred embodiment of the invention, the inventive radio receiver system 10 has two delay modes. In the first delayed mode, after the last 15 seconds have been played back by actuation of button 48, the system automatically reverts to output into the audio system the undelayed signal. In a second repeat vote, upon actuation of button 48, the receiver audio system is caused to output a fifteen second delayed signal until the delay is canceled by depression of pushbutton switch 54, at which point the undelayed signal output by analog to digital converter 20 is passed by switch 26 to digital to analog converter 28.

Switching between repeat modes may be done by repeated actuation of switch 56. The repeat mode may be displayed in display 46 for a short period of time after which displayed 46 goes back to the default display which may be the frequency or channel, the time, or any other desired default.

In accordance with the preferred embodiment of the invention, it is also contemplated that buttons 48, 50 and 52 may be replaced by a single button which when repeatedly pressed allows selection of the delay time. The selected delayed time may be displayed in display 46 during operation of such a button.

Thus, in accordance with the present invention, if the driver wishes to have a desired recently heard segment replayed, he may select how far back he wishes to go in time to hear information or other content again. If he wishes to hear a repeat of a weather or traffic report or an item of news, the selection of the appropriate delayed signal may be made. Moreover, the system may also be used for entertainment purposes, for example by the selection of a three-minute delayed repeat to hear a particular song again.

In accordance with the preferred embodiment, the repeated last three-minute segment may be replaced by a repeated song selection. In accordance with this alternative embodiment, it is contemplated that the system will scan the outputs of the bistable multivibrators in shift register 22 for the pause which usually occurs before and after a song, and the extended period of relatively high amplitude signals associated with the playing of the song to automatically determine the beginning and the end of the song and allow the song to be replayed as a unit.

An alternative embodiment of the wireless receiver 110 of the present invention is illustrated in FIG. 5. In this embodiment, antenna 114 provides signals to receiver 112. Receiver 112 provides its output to base switch 132 and a pair of delay lines 118 and 119. The operation of delay lines 118 and 119 is controlled by control circuit 130. Switch 132 couples either the output of delay line 118, the output of delay line 119, or the undelayed output of wireless receiver 112 to an audio amplifier 134. Audio amplifier 134, in turn, drives speaker system 136 to produce the audio output of system 110.

During operation, incoming radio signals are picked up by antenna 114 and carried by cable 116 to wireless receiver 112. Wireless receiver 112 outputs an audio signal which is coupled to switch 132 and also to delay lines 118 and 119. During normal operation, the output of analog to digital converter 120 passes through switch 132 to audio amplifier 34. However, upon actuation of the panel controls, as described above, the output of digital delay line 118 is provided by switch 132 to audio amplifier 134. At the same time, the output of wireless receiver 112 ceases to be sent to digital delay line 118 which holds only the single sequence which it held when the repeat function was actuated. Thus, this sequence may be repeatedly played over and over again until the operator instructs the system to cease storage of that sequence. This is particularly useful, for example, in the context of storing a complete song which can then be replayed over and over.

Such a system may be controlled by a panel 140, as illustrated in FIG. 6. Panel 140 is somewhat similar to panel 40 except that it has a single button 148 used to select the length of the delay desired. This length is displayed in display 146. Multiple presses of the button result in sequential display of different repeat segment lengths. This causes display 146 to show the various fifteen second, thirty second, three minute or other delay functions in the context of allowing repeated play of a particular segment, such as a song. Alternatively, the "tune" knob may be used to vary time over a wide range and number of values. The system also has a stop repeat button 150 which causes the system to resume playing the undelayed signal. The system also has a repeat mode button 152 similar to button 52. In addition, the system includes a repeat button 154 which causes the system to repeat again the last repeated segment.

A second switch 32 controls temporal aspects of the operation of the inventive wireless receiver system 10. More particularly, this is achieved through switch 32 which is coupled directly to wireless receiver 12 and the output of digital to analog converter 28. Accordingly, the selection of which of the inputs of switch 32 is to be input into an audio amplifier 34 is controlled by a selection switch 32.

Also in accordance with the present invention, it is contemplated that control over a temporal feature in operation of an electronic device may be implemented together with another feature. For example, if the device receiving a radio transmission is a cell phone, the system could (in addition to or instead of putting the content of the transmission through the delay line thus making a recording of the content of the transmission and allowing it to be stored after being heard) immediately pick up the call, play a prerecorded message to the effect that the individual is driving and will pick up the telephone in a short time (which message may be repeated), and allow the operator to pick up the telephone when he is able. The system may also, in the prerecorded message, tell the caller that he may leave a short message if the caller is short on time. The system may then use the delay line to record a short message.

The presence of the cellular telephone in a car may be monitored electronically through the use of a radio signal, an infrared signal, or the like. Alternatively, the same may be sensed by placing the cellular telephone in a charging cradle.

As is alluded to above, the inventive system may be implemented in various ways. for example, sound from a radio may be digitized using an analog to digital converter (ADC) and the digital data stored using the first port of a dual ported memory. The second port is used to extract the digitized data from the memory and send it to a digital to analog converter (DAC) where it converted back to sound which can be played through the radio's speakers. As the memory has finite size, when a memory pointer reaches the end of the memory it is reset to the beginning of the memory. This gives the system the capability of having a recording loop the length of which (in time) is determined by the size of the memory. The position in the memory from which the digitized data is extracted (the second pointer) can be varied relative to the position where new data are being stored into the memory at the first pointer. The difference between the two pointers sets the delay between the data being acquired and the data being played back. Setting the two pointers nearly equal to one another provides near zero delay and the user will effectively hear real time radio broadcast. Alternatively, one could bypass this circuit. Moving the second pointer so that its position is such that the data it is extracting is behind the real time data at the first pointer provides delayed listening. Adjusting the position of the second pointer therefore adjusts the delay time. Substantial time delays are possible with available memories.

While an illustrative embodiment of the invention has been described, the invention is only limited by the claims and modifications which become obvious to those of ordinary skill of the art are within the spirit and scope of the invention as defined by the appended claims.

The invention claimed is:

1. A mobile radio system, comprising:
   (a) a vehicle;
   (b) a radio contained within said vehicle said radio being of the type which receives broadcast radio transmissions of music, weather, news and the like, such as standard AM or FM broadcast transmissions, said radio having an audio output coupled to a speaker in a vehicle to enable it to be heard by a driver or other radio listener;

(c) digital memory coupled to receive the output of said radio, wherein said digital memory captures at least one transmitted segment and each segment is characterized by a duration; and (d) one or more user-controlled memory selection switches coupled to said digital memory, wherein said delay selection switches direct the replay of said at least one transmitted segment upon actuation of one of said switches, said segment having a duration of five minutes or less, and said segment comprising the output of said radio during a period of time substantially preceding the actuation of one of said switches, said segment beginning a period of time before the actuation of said switch and ending about the time of the actuation of said switch to define said captured segment of the output of said radio and said segment having said duration, whereby the driver or other listener to the radio may hear for a second time certain information from said output of said radio which was output substantially before actuation of said switch.

2. A mobile radio system for a vehicle as in claim 1, wherein said memory selection switch comprises a single button which is operably linked to, and selects among, the output of said radio and said digital memory upon being depressed one or more times.

3. A mobile radio system for a vehicle as in claim 1, wherein said one or more user-controlled memory selection switches comprises three switches, wherein each of said switches is operably linked to a respective digital memory segment, each of said digital memory segments having a different duration.

4. A mobile radio system as in claim 1, wherein said digital memory is coupled to receive output of a wireless receiver and further comprises a memory comprising an input pointer for inputting data and an output pointer for outputting data, wherein said pointers facilitate the replay of captured segments.

5. A receiver system for a vehicle, comprising:
(a) a wireless receiver of the type which receives broadcast transmissions of music, weather, news and the like, such as standard AM or FM broadcast transmissions, said wireless receiver having an audio output coupled to a speaker in a vehicle to enable it to be heard by a driver or other radio listener;
(b) digital memory coupled to receive the output of said wireless receiver, wherein said digital memory captures at least one transmitted segment and said segment is characterized by a duration of five minutes or less; and
(c) one or more user-controlled memory selection switches coupled to said digital memory to select replay of a captured segment, said segment comprising the output of said wireless receiver during a period of time substantially preceding the actuation of one of said switches, said segment beginning a period of time before the actuation of said one of said switches and ending about the time of the actuation of said one of said switches to define said segment of the output of said wireless receiver and said segment having said duration, whereby the driver or other listener to the wireless receiver may hear for a second time certain information from said output of said receiver which was output substantially before actuation of said switch.

6. A receiver system as in claim 5, wherein said one or more user-controlled memory selection switches, wherein each of said switches is operably linked to a different captured segment and each of said captured segments having a different temporal delay.

7. A receiver system as in claim 5, wherein the duration of said transmitted segment ends upon actuation of said user-controlled memory selection switch.

8. A receiver system as in claim 5, wherein said memory selection switch comprises a single button which selects among the output of said wireless receiver and said one or more captured segments upon being depressed.

9. A receiver system as in claim 5, wherein said memory selection switch comprises first, second and third buttons, said buttons being positioned on a control panel associated with said wireless receiver, actuation of one of said buttons resulting in replaying of segments of different duration, depression of said first button resulting in playback of a first recent transmitted segment having a first duration, depression of said second button resulting in a second recent transmitted segment having a second duration, and depression of said third button resulting in playback of a recent transmitted segment having a third duration.

10. A receiver system as in claim 5, further comprising a memory device capable of storing a recent transmitted segment until said user-controlled memory selection switch is actuated to discard said transmitted segment.

11. The receiver system as in claim 5, wherein said wireless receiver is a radio.

12. A received for an automobile as in claim 5, wherein said duration is three minutes or less.

13. A mobile radio system for a vehicle, comprising:
(a) a radio adapted to be contained within said vehicle said radio being of the type which receives broadcast radio transmissions of music, weather, news and the like, such as standard AM or FM broadcast transmissions, said radio having an audio output counted to a speaker in a vehicle to enable it to be heard by a driver or other radio listener;
(b) digital memory coupled to receive the output of said radio; and
(c) a replay circuit coupled to said digital memory to replay the output of said radio for a recent segment in response to actuation of a switch by a person riding in said vehicle said segment having a duration of five minutes or less; and
(d) said segment comprising the output of said radio during a period of time substantially preceding the actuation of said switch, said segment beginning a period of time before the actuation of said switch and ending about the time of the actuation of said switch to define said captured segment of the output of said radio and said segment having said duration, whereby the driver or other listener to the radio may hear for a second time certain information from said output of said radio which was output substantially before actuation of said switch.

14. A receiver system, comprising:
(a) a wireless receiver contained within a vehicle said wireless receiver being of the type which receives broadcast radio transmissions of music, weather, news and the like, such as standard AM or FM broadcast transmissions, said wireless receiver having an audio output coupled to a speaker in a vehicle to enable it to be heard by a driver or other radio listener;
(b) digital memory coupled to receive the output of said wireless receiver;
(c) a memory selection switch coupled to said digital memory to route the output of said wireless receiver for replay with a temporal delay;
(d) a control device associated with said wireless receiver for receiving control selections from a person to store a previous segment said output having a said duration segment of three minutes or less; and (e) a repeat button for causing the play of said segment said segment comprising the output of said wireless receiver during a period of time substantially preceding the actuation of said switch, said segment beginning a period of time before the actuation of said switch and ending about the time of the actuation of said switch to define said segment of the output of said wireless receiver and said segment having said duration, whereby the driver or other listener to the wireless receiver may hear for a second time certain information from said output of said receiver which was output substantially before actuation of said switch.

15. The receiver system as in claim 14, wherein said wireless receiver is a radio.

16. A receiver system comprising:
(a) a wireless receiver contained within a vehicle said wireless receiver being of the type which receives broadcast radio transmissions of music, weather, news and the like, such as standard AM or FM broadcast transmissions, said wireless receiver having an audio output coupled to a speaker in a vehicle to enable it to be heard by a driver or other radio listener;
(b) one or more digital delay lines coupled to receive the output of said wireless receiver, wherein said delay lines are capable of capturing a transmitted segments and each transmitted segment is characterized by a duration, said duration being three minutes or less; and
(c) one or more user-controlled delay selection switches coupled to said delay lines are capable of selecting the replay of a captured segment with a temporal delay said segment comprising the output of said wireless receiver during a period of time substantially preceding the actuation of said switch, said segment beginning a period of time before the actuation of said switch and ending about the time of the actuation of said switch to define said segment of the output of said wireless receiver and said segment having said duration, whereby the driver or other listener to the wireless receiver may hear for a second time certain information from said output of said receiver which was output substantially before actuation of said switch.

17. The receiver system as in claim 16, wherein said receiver system comprises one user-controlled delay selection switch, wherein said switch is capable of replaying a plurality of captured segments, a captured segment for replay selected by actuating said switch one or more times.

18. The receiver system as in claim 16, wherein said receiver system comprises a plurality of user-controlled delay selection switches, wherein each of said switches directs the replay of a captured segment of different duration.

19. The receiver system as in claim 18, wherein said receiver system comprises three user-controlled delay selection switches, and said durations are about 15 seconds, about 30 seconds, and about three minutes.

* * * * *

UNITED STATES PATENT AND TRADEMARK OFFICE
CERTIFICATE OF CORRECTION

PATENT NO. : 7,493,099 B2 Page 1 of 1
APPLICATION NO. : 10/199767
DATED : February 17, 2009
INVENTOR(S) : Warren Stephen Slutter et al.

It is certified that error appears in the above-identified patent and that said Letters Patent is hereby corrected as shown below:

Column 8, Line 25, Claim 12:

Delete "received" and insert -- receiver --.

Column 9, Line 27, Claim 16:

After "capable of capturing"

Delete "a".

Signed and Sealed this

Eighth Day of December, 2009

David J. Kappos
*Director of the United States Patent and Trademark Office*